3,824,191

PROCESS OF PREPARING SILICATES OF HIGH POROSITY AND SILICATES OBTAINED BY SAID PROCESS
Raymond Wey, Mulhouse Dornach, Pierre Guisen, Mulhouse, and Ronan Le Dred, Riedisheim, France, assignors to Compagnie Francaise de Raffinage, Paris, France
No Drawing. Filed Jan. 19, 1972, Ser. No. 219,142
Claims priority, application France, Jan. 20, 1971, 7101794
Int. Cl. C04b 31/22, 31/26
U.S. Cl. 252—378 R
10 Claims

ABSTRACT OF THE DISCLOSURE

Novel processes, compositions (of the type of the resulting product), and uses therefor; concerning formation of exfoliated vermiculite from commercial vermiculite by successive treatments with a saline solution, with water, and with an acid followed by washing with water until neutral, resulting in an expanded product having a greatly increased specific surface, pore volume, and average pore radius (the values of which can be substantially controlled to give a desired taylor-made product by variation of the time, heat, concentration, pressure and like parameters), the usefulness of said products including that of a desiccant.

---

The present invention relates to a process for obtaining porous silicates having large surface area and to the silicates of the type obtained by means of said process. More particularly, it concerns the application of the process with respect to commercial vermiculites.

Vermiculite, in the strict sense of mineralogical classification, is a very rare silicate. Its structure results from the stacking of T-O-T (tetrahedron-octahedron-tetrahedron) sheets. Such a sheet is formed by the application of two tetrahedral layers on opposite sides of an octahedral layer. The skeleton is formed of oxide and hydroxide ions which define the octahedral and tetrahedral cavities. The octahedral cavities are filled primarily with $Mg^{2+}$ and Fe ions, and the tetrahedral cavities with $Si^{4+}$ and $Al^{3+}$ ions. Such an edifice is not electrically neutral but contains negative charges, generally compensated by hydrated $Mg^{2+}$ and $Ca^{2+}$ ions located between the sheets. These ions are exchangeable by other cations.

Vermiculite is a naturally altered mica. Like the vermiculite which it produces, a mica results from the stacking of T-O-T sheets, but the intersheet compensating cations are nonhydrated and nonexchangeable $K^+$ ions.

The general formula of a vermiculite in the strict sense is:

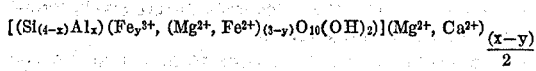

The minerals sold under the name of vermiculite (commercial vermiculite) are, on the other hand, very widespread in natural state. These products are micas which are incompletely altered to vermiculite. They are intermediate products between mica and vermiculite or else mica-vermiculite interlaminate. They are present in the form of crystalline platelets of large dimensions showing a perfect cleavage along the (001) plane.

The overall formula of a commercial vermiculite is:

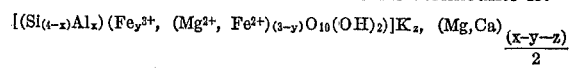

Thus, for instance, in its work the applicant has used as raw material a commercial vermiculite of the following structural formula:

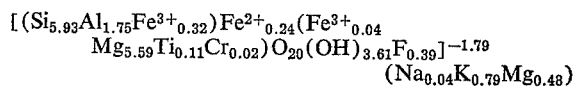

This interlaminate is formed of about 50% sheets of mica (type M) and 50% sheets of vermiculite (type V). The sheets form:

sequences: M-M-M-M (very few)
sequences: V-V-V-V-V
stacks having an approximately regular mica-vermiculite alternation: M-V-M-V-M-V . . .

The magnesium ions are exchangeable by other cations, while the potassium ions are not exchangeable.

The cation exchange capacity is 80 gram milli-equivalents per 100 g. of calcined mineral at 1000° C.

Commercial vermiculite has a low specific surface (generally less than 5 m.$^2$/g.), which limits its applications.

An object of the present invention is to increase the specific surface and the porosity of commercial vermiculite.

It is known that vermiculites have the property of swelling in water; thus, for instance, certain vermiculities whose compensation cations are $Li^+$ ions or alkyl ammonium (butyl ammonium) ions have this property. However, the commercial vermiculites do not swell upon direct contact with water. It is necessary to treat them first with a concentrated saline solution (for instance NaCl) and then contact them with water.

It is also known that certain micas are attacked by solutions of hydrochloric acid and that certain vermiculites the size of the flakes of which is less than 0.25 mm. have their specific surface increased by acid treatment, but that subsequent heating causes a decrease in the specific surface.

The applicant had the idea of successively treating a commercial vermiculite having large size flakes with a swelling process and with an acid-treatment process in order to obtain a material of high porosity.

The present invention therefore comprises a process of treating a commercial vermiculite by subjecting said vermiculite in succession:

(1)—to a treatment with a saline solution;
(2)—to a treatment with water;
(3)—to a treatment with an acid followed by washing with water until neutral.

Another aspect of the present invention comprises the porous silicates whose specific surface is between a few m.$^2$/g. and 750 m.$^2$/g., pore volume is between 1 and 60 cm.$^3$/100 g., and average pore radius is between 10 and 35 A. Advantageously said silicates have a specific surface of greater than 40 m.$^2$/g., a pore volume of greater than 2.5 cm.$^3$/100 g. and an average pore radius greater than 10 A.

Upon the saline treatment of commercial vermiculite, there is a penetration of the salt and a partial exchange of $Mg^{2+}$ ions located between the V sheets by $Na^+$ ions (when the salt is, for instance, NaCl). There is also noted replacement by Na+ ions of a part (about 20%) of the K+ ions located between the M sheets.

The substitution reaction is a slow reaction. The concentration of the salt, as well as the temperature, is not very critical. One generally employs a solution of a concentration of between 1 gram atom of cation per liter of solution and that of the saturated solution, preferably a solution whose concentration is between that of a semi-saturated solution and that of a saturated solution, and at a temperaure of between the freezing point of the solution of 500° C. (under pressure), preferably at room temperature, namely 20 to 30° C., for the sake of convenience.

Salts other than NaCl can be used to achieve the saline treatment. The application has successfully used LiCl and $CaCl_2$ in addition to NaCl. The salts which are suitable are generally those which have good solubility, whose cation is very hydratable, and the anion of which is relatively small.

The treatment by distilled water of the commercial vermiculite complex—salt obtained causes the complex to swell macroscopically with desorption of the salt. This swelling takes place in the direction perpendicular to the sheets. The V sheets swell strongly, while the M sheets do not swell. The volume of the swollen mineral may, for instance, reach eight times the volume of the natural minueral. It is advantageous to renew the water during this treatment.

The acid attack takes place at a faster speed on the internal surface of the V sheets since they are greatly swollen, than at the internal surface of the M sheets. The invention therefore makes it possible to obtain a product having good rigidity and good mechanical strength, even though the flakes of commercial vermiculite are of large dimensions. Thus the applicant has successfully used the process of the invention with commercial vermiculites the flakes of which had an average size of 2 mm. The acid treatment can be effected by any inorganic acid, for instance hydrochloric acid.

One operates at a temperature between the freezing point and the boiling point of the solution, and preferably between 20° C. and 80° C.; at a proton concentration of the solution of between 0 and more than 10 N, and preferably between 0.1 and 3 N; and for a period of time which depends upon the values of the preceding two parameters.

The values of these different parameters of the reaction determine the values of the specific surface, of the pore volume, and the average pore radius of the porous silicate obtained.

It is not necessary for all the salt to be eliminated before the acid treatment is effected.

The present invention is furthermore illustrated by the following examples, which are given by way of illustration and not of limitation.

EXAMPLE I

There is used commercial vermiculite having the formula given above and the chemical composition of which, expressed in grams of oxides per 100 grams of vermiculite, is:

| | |
|---|---|
| $SiO_1$ | 38.59 |
| $Al_2O_3$ | 9.69 |
| $TiO_2$ | 0.98 |
| $Cr_2O_3$ | 0.16 |
| $Fe_2O_3$ | 3.08 |
| FeO | 1.89 |
| MnO | 0.00 |
| MgO | 26.50 |
| CaO | 0.00 |
| $Na_2O$ | 0.14 |
| $K_2O$ | 4.02 |
| [1] $H_2O$ | 13.88 |
| $P_2O_5$ | 0.00 |
| $CO_2$ | 0.00 |
| F | 0.80 |
| | 99.73 |
| [2] O=F | −0.34 |
| Total | 99.39 |

[1] Losses of water by heating from room temperature to 1000° C.
[2] This correction is necessary since certain elements are present at least in part in the form of fluorides. As the mineral is electrically neutral, this means that 0.80 g. of fluorine coresponds to $$\frac{0.80 \times 16}{2 \times 19} = 0.34 \text{ g.}$$

of oxygen since, from an electrical viewpoint, 1 gram atom of oxygen corresponds to 2 gram atoms of fluorine.

This vermiculite is present in the form of flakes of average size of 2 mm.; the brown color of this mineral is due to the presence of iron ions.

Its apparent density is 2.3.

250 grams of this mineral are contacted with two liters of sodium chloride solution at the laboratory temperature, namely about 20° C. At the end of 2 months, the mineral is contacted with 4 liters of distilled water, changed each day until elimination of the salt, which requires about 2 weeks. The swollen mineral obtained contains 90% water.

The time required for the obtaining of the swollen mineral can be greatly reduced by repeating 2 or 3 times the combined saline treatment-water treatment.

50 grams of swollen mineral are treated with 500 ml. of a solution of hydrochloric acid. After treatment, the mineral is rinsed abundantly with distilled water until free of acidity and then dried at 60° C.

The values of the specific surface S, of the pore volume Vp and of the average radius Rp of the pores obtained by varying the conditions of attack are entered in Table I.

TABLE I

| | Conditions of the acid attack | | | Characteristics of the mineral obtained | | |
|---|---|---|---|---|---|---|
| | Concentration | Temperature (° C.) | Time (days) | S ($m.^2$/g.) | Vp ($cm.^3$/100 g.) | Rp (A.) |
| Test number: | | | | | | |
| 1 | 0.5 N | 80 | 1 | 286 | 17.5 | 12.2 |
| 2 | 2.5 N | 20 | 4 | 365 | 26 | 14 |
| 3 | 0.5 N | 80 | 4 | 747 | 53 | 14.1 |
| 4 | 2.5 N | 80 | 1 | 626 | 57 | 18.3 |
| 5 | 2.5 N | 80 | 4 | 386 | 53 | 27.5 |
| Before acid attack | | | | 0.85 | 0.15 | |

The products maintain the appearance and dimensions of the original flakes.

Their initially brown color becomes progressively white as the iron ions pass into solution.

Their apparent density descreases from 2.3 to 1.4 depending on the severity of the acid attack.

The products are classified in Table I by increasing order of attack.

The values of the specific surfaces have been deduced from nitrogen absorption measurements at 77° K. (B.E.T. method) after treatment of the products at 250° C. under vacuum of $10^{-4}$ mm. Hg for about 15 hours.

Tests 1 and 2 are made at the start of the attack. The specific surface and the pore volume are already substantial. The average pore radius is rather small.

Test 3 (S=747 m.²/g.) must take place near the maximum specific surface.

Tests 4 and 5 produce porous silicates of white color which are strongly attacked:

the specific surface decreases substantially;
the pore volume remains substantially the same (greater than 50 cm.³/100 g.);
the average pore radius increases.

EXAMPLE II

A commercial vermiculite identical to that used in Example I is swollen by the process described in Example I.

50 g. of the mineral obtained are treated with a solution of hydrochloric acid under conditions similar to those described in Example I.

The results have been entered in Table II. They relate to products on which the acid treatment was not applied thoroughly.

TABLE II

| | Conditions of the acid attack | | | Characteristics of the mineral obtained | | |
|---|---|---|---|---|---|---|
| | Concentration | Temperature (° C.) | Time (days) | S (m.²/g.) | Vp (cm.³/ 100 g.) | Rp (A.) |
| Test number: | | | | | | |
| 6 | 0.1 N | 80 | 4 | 43 | 2.5 | 11.5 |
| 7 | 0.5 N | 20 | 4 | 56 | 3.4 | 12.1 |
| 8 | 2.5 N | 20 | 1 | 45.6 | 2.9 | 12.7 |

It would appear that for a given value of the specific surface of the mineral obtained, the average radius of the pores depends on the concentration of the acid solution.

Examples I and II show that the process of the invention makes it possible to obtain vermiculites whose values of specific surface and porosity cover a wide range.

EXAMPLE III

This example is intended to show the properties of the silicates of high porosity obtained.

In a first series of tests, the specific surface of the porous silicates obtained is measured before and after heating for two hours.

The results have been entered in Table III.

TABLE III

| | S (m.²/g.) before heating | Heating temperature, ° C. | S (m.²/g.) after heating |
|---|---|---|---|
| Test number: | | | |
| 9 | 626 (Test 4) | 250 | 626 |
| 10 | do | 450 | 555 |
| 11 | 386 (Test 5) | 250 | 386 |
| 12 | do | 450 | 417 |
| 13 | do | 550 | 407 |

The resistance to heating of the silicates of high porosity is very good.

In a second series of tests, the water-vapor absorption capacity at a pressure of 13.5 mm. Hg is determined at different temperatures by means of a MacBain balance. The porous silicate is previously heated at 350° C. for 90 minutes under a vacuum of $10^{-2}$ mm. Hg.

The results have been entered in Table IV; they are expressed in grams of water absorbed per 100 grams of porous silicate.

TABLE IV

| | S (m.²/g.) | Water taken up (g./100 g.) at— | | |
|---|---|---|---|---|
| | | 60° C. | 40° C. | 22° C. |
| Test number: | | | | |
| 14 | 286 (Test 1) | 3.64 | 7 | 13.9 |
| 15 | 747 (Test 3) | 5.8 | 13 | 41.5 |
| 16 | 626 (Test 4) | 5.66 | 10.5 | 42.6 |
| 17 | 386 (Test 5) | 5.06 | 9 | 37.9 |

The values for the water taken up follow a variation similar to that of the specific surface.

The process of the invention is very advantageous, since it is carried out on a product which is abundantly available. Furthermore, the simplicity of the treatments should be noted. It makes possible an easily practiced process.

The porous silicates obtained find numerous applications in connection with their high specific surface and porosity, and with their excellent resistance to heat. Thus, for instance, they can be used as drying substance.

What is claimed is:

1. A process of preparing an exfoliated vermiculite with improved specific surface and porosity comprising essentially the following successive steps:
   (a) treating a vermiculite with an aqueous saline solution of a salt comprising a very hydratable cation and an anion of small size, of a concentration of between 1 gram atom of cation per liter and saturation, and at a temperature between the freezing point of the saline solution and 500° C., for a length of time at least to achieve a partial exchange of ions;
   (b) swelling the salt treated vermiculite and desorbing the salt from the treated vermiculite by immersion in water to yield exfoliated vermiculite;
   (c) treating said exfoliated vermiculite with an inorganic acid at a temperature between the freezing point and the boiling point of the solution and with a normality of the solution of between 0.1 and about 10 N and for a time sufficient to yield a porous vermiculite having physical characteristics of a specific surface of at least 286 m.²/g., a pore volume of at least 17.5 cc./100 g. and an average pore radius of at least 12.2 A.
   (d) washing with water until neutral;
   (e) drying and recovering the vermiculite.

2. A process according to Claim 1 wherein the saline treatment is continued for many weeks until the penetration and the resulting cation exchange between the cations of the salt and the vermiculite are complete as a practical matter and said water treatment includes the bathing of the vermiculite in repeatedly renewed amounts of fresh water over many days.

3. A process according to Claim 1, wherein said saline step is effected at about room temperature and at a concentration between half-saturation and saturation of the solution.

4. A process according to Claim 1, wherein the saline solution used belongs to the group consisting of solutions of sodium chloride, lithium chloride and calcium chloride.

5. A process according to Claim 1, further comprising repeating the saline plus water treatments a plurality of times.

6. A process according to Claim 5, wherein the treatment by water is continued until all the free salt is eliminated.

7. A process according to Claim 1, wherein the acid treatment is at a normality of the solution of between 0.1 and 3 N.

8. A process according to Claim 1, wherein the acid used is hydrochloric acid.

9. A process according to Claim 4, wherein the average size of the flakes of the commercial vermiculite treated ranges from 0.25 mm. to at least 2.0 mm.

10. A composition comprising a porous exfoliated vermiculite obtained according to the process of Claim 1.

References Cited
UNITED STATES PATENTS

| | | | |
|---|---|---|---|
| 3,076,546 | 2/1963 | Ziegler et al. | 252—378 R |
| 3,677,939 | 7/1972 | Patil et al. | 210—37 |
| 3,356,611 | 12/1967 | Forbes et al. | 252—378 R |
| 3,434,917 | 3/1969 | Kraus et al. | 161—168 |
| 3,062,753 | 11/1962 | Hayes | 252—378 R |
| 2,366,217 | 1/1945 | Ruthruff | 252—450 |
| 2,377,577 | 6/1945 | Ruthruff | 252—450 |

DANIEL E. WYMAN, Primary Examiner

PAUL E. KONOPKA, Assistant Examiner

U.S. Cl. X.R.

106—DIG. 3; 161—168; 252, 450